(12) United States Patent
Figaschewsky et al.

(10) Patent No.: US 12,716,718 B2
(45) Date of Patent: Aug. 25, 2026

(54) METHOD FOR DETERMINING A SHAPE OF A MISTUNED BLADE OF AN IMPELLER OF A TURBOMACHINE

(71) Applicant: Rolls-Royce Deutschland Ltd & Co KG, Blankenfelde-Mahlow (DE)

(72) Inventors: Felix Figaschewsky, Berlin (DE); Thomas Giersch, Königs Wusterhausen (DE); Moritz Wirth, Berlin (DE); Jens Nipkau, Potsdam (DE); Christopher Hemerly, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 294 days.

(21) Appl. No.: 18/424,181

(22) Filed: Jan. 26, 2024

(65) Prior Publication Data

US 2024/0263942 A1 Aug. 8, 2024

(30) Foreign Application Priority Data

Feb. 6, 2023 (DE) ..................... 10 2023 102 798.0

(51) Int. Cl.
*G01B 21/20* (2006.01)

(52) U.S. Cl.
CPC .................................... *G01B 21/20* (2013.01)

(58) Field of Classification Search
CPC ...................................................... G01B 21/20
(Continued)

(56) References Cited

U.S. PATENT DOCUMENTS

2006/0073022 A1 4/2006 Gentile
2014/0050590 A1* 2/2014 Ghorbani Zarimahalleh .............. F04D 29/666 416/241 R (Continued)

FOREIGN PATENT DOCUMENTS

CN 108710746 A 10/2018
CN 111368373 A 7/2020

(Continued)

OTHER PUBLICATIONS

European Search Report dated Feb. 21, 2025 from counterpart EP App No. EP 24155912.

(Continued)

*Primary Examiner* — Nathaniel T Woodward
(74) *Attorney, Agent, or Firm* — SHUTTLEWORTH & INGERSOLL, PLC; Timothy J. Klima

(57) ABSTRACT

A method for determining a shape of a mistuned blade of an impeller includes: providing a nominal blade with radially threaded-on profile elements; providing an initially mistuned blade with profile elements, the mistuned blade having a reduced or increased thickness at at least one of the profile elements compared with the nominal blade; determining the shape of the nominal blade in a hot state; determining the shape of the mistuned blade in the hot state; comparing the two shapes and determining a parameter of the mistuned blade which differs from the corresponding parameter for the nominal blade in the hot state; and changing the value of this parameter for the mistuned blade in the cold state such that the difference between the parameter for the mistuned blade and the nominal blade in the hot state no longer exists.

17 Claims, 9 Drawing Sheets

(58) Field of Classification Search
USPC .......................................................... 73/865.8
See application file for complete search history.

(56) References Cited

U.S. PATENT DOCUMENTS

2019/0226500 A1 7/2019 Xu
2020/0141242 A1 * 5/2020 Nolcheff ............... F04D 29/324

FOREIGN PATENT DOCUMENTS

DE 102014204725 A1 9/2015
EP 1710551 A1 10/2006

OTHER PUBLICATIONS

P. Gudmundson: Tuning of Turbine Blades: A, D A Theoretical Approach, Journal of Engineering for Power, ISSN 0022-0825, vol. 105, Nr. 2, S. 249-255, 1983.
German Search Reported dated Oct. 19, 2023 from counterpart German App No. 10 2023 102 798.0.

* cited by examiner

METHOD FOR DETERMINING A SHAPE OF A MISTUNED BLADE OF AN IMPELLER OF A TURBOMACHINE

This application claims priority to German Patent Application 10 2023 102 798.0 filed Feb. 6, 2023, the entirety of which is incorporated by reference herein.

The invention relates to methods for determining the shape of a mistuned blade of an impeller of a turbomachine and to blades produced by these methods.

It is known to actively mistune the impellers of turbomachines, i.e., to impose specific deviations of the blade natural frequencies on the impeller blades in addition to production-related and thus random deviations of the blade natural frequencies. Targeted mistuning of an impeller reduces certain vibration excitations of the impeller. One possibility for mistuning is to make specific changes to the thickness of the blades. This is described, for example, in P. Gudmundson: "Tuning of Turbine Blades: A Theoretical Approach", Journal of Engineering for Power, ISSN 0022-0825, Vol. 105, No. 2, pp. 249-255, 1983.

It should be noted that, due to centrifugal force, the blade of an impeller straightens up during operation when the impeller rotates. Changing the thickness of a blade to mistune it not only changes the dynamic properties (vibration frequencies), but also the static properties (torsional stiffness and rotating mass) and the aerodynamic profiles. The change in static properties means that the blade undergoes a design change in the straightened-up state (in the so-called "hot shape") compared to the cold state of the blade (when the impeller is not rotating). Such a design change can have a negative impact on efficiency.

The object of the present invention is to provide a method for determining the shape of a mistuned blade of an impeller of a turbomachine, wherein the desired shape avoids negative effects of the blade shape in the hot state, which are due to a change in thickness of the blade in the cold state. Furthermore, a corresponding blade of an impeller is to be provided.

Said object is achieved by a method and a blade having features as disclosed herein. Embodiments of the invention are indicated in the dependent claims.

Then, in a first aspect of the invention, the invention considers a method for determining the shape of a mistuned blade of an impeller of a turbomachine. The method comprises the following steps:

- providing a nominal blade which has multiple radially threaded-on profile elements,
- providing an initially mistuned blade which has multiple radially threaded-on profile elements, the initially mistuned blade having a reduced or increased thickness at at least one of the profile elements compared with the nominal blade,
- determining the shape of the nominal blade in the hot state of the nominal blade,
- determining the shape of the initially mistuned blade in the hot state of the initially mistuned blade,
- comparing the two shapes determined in the hot state and determining at least one parameter of the initially mistuned blade, the value of which differs from the corresponding parameter value for the nominal blade in the hot state, and
- changing the value of this parameter for the initially mistuned blade in the cold state in such a way that a difference between the values of this parameter for the mistuned blade and the nominal blade in the hot state no longer exists. Here, the initially mistuned blade with the at least one changed parameter forms a final mistuned blade.

The solution according to the invention is based on the idea of avoiding the consequences of a change in the thickness of a blade, which occur when the blade is hot, by shaping the blade in the cold state in such a way that the undesirable consequence does not even occur in the hot state. This is achieved by changing the parameter for the initially mistuned blades in the cold state. The undesirable design that results when the blade straightens up in the hot state is thus avoided to a certain extent by changing the design inversely in the cold state. The solution according to the invention thus minimizes the detrimental effects on the aerodynamic efficiency and the noise development when a rotating blade of a turbomachine is provided with a frequency mistuning.

In embodiments, the way in which the profile elements are stacked on top of each other and/or the staggering angle in the cold state are corrected, as will be explained.

It should be noted that the feature of the "shape of a blade" is to be interpreted broadly. In particular, this includes all parameters that influence the blade itself or its orientation on an impeller. This includes, for example, the staggering angle, the blade camber angle, the incidence angle, the deviation angle, the blade entry angle, the blade exit angle, the pitch of the blade and the narrowest cross-section of the blade channel between two blades. If only one of these parameters is changed in one of the profile elements, the blade shape is changed or the blade is mistuned in comparison to a nominal blade in the sense of the present invention.

It should also be noted that a profile element is defined as a profile section of small thickness through the blade. It is known that a blade profile is defined by the radial threading-on of individual profile elements.

It should also be noted that the term "blade" in the sense of the present invention primarily refers to the blade face, i.e., the structure that interacts with a flowing medium. Depending on the embodiment, the blade may additionally comprise further components, for example a blade platform and a blade root, by which the blade is arranged in a rotor disk. The latter components can also determine the natural frequency of the blade. However, a change in thickness provided according to the invention has been made on the blade.

In further exemplary embodiments, the blade can be a one-piece component of an impeller which is embodied in BLISK design, for which case the rotor disk, the rotor hub and the impeller blades are formed integrally (in one piece) (BLISK="Blade Integrated Disk"), or which is embodied in BLING design, for which case the rotor hub and the impeller blades are formed integrally (in one piece) (BLING="Blade Integrated Ring"). For an impeller in BLISK design or BLING design, the blade consists substantially of the blade face, wherein this merges into a flow-delimiting surface, for example a rotor hub, at at least one axial end.

In exemplary embodiments, the blade considered according to the invention is the blade of a fan. However, the invention can also be used for other impeller blades, for example for blades of a compressor stage or a turbine stage of a gas turbine engine.

One embodiment of the invention provides that the parameter of the initially mistuned blade, which is determined in the hot state, is the staggering angle of at least one profile element of the blade, wherein the staggering angle of the initially mistuned blades are changed in the cold state in such a way that the change in the staggering angle is canceled out in the hot state. By correcting the staggering angle, it is possible to ensure that the narrowest cross-section between two blades remains constant in the hot state. This is important because deviations of the narrowest cross-section from a design point result in compression shocks being absorbed more strongly or being shifted outwards more strongly, so that a flow cannot pass through the blade channel between two blades with maximum efficiency.

The staggering angle of the initially mistuned blades in the cold state is changed, for example, in such a way that the staggering angle in the cold state is changed by the amount by which it differs from the staggering angle of the nominal blade in the hot state.

In a further embodiment, the staggering angle of the initially mistuned blade is changed iteratively in the cold state, wherein the method comprises the following steps:

a) in a first step, changing the staggering angle of the initially mistuned blade in the cold state by a first amount,
b) determining the resultant staggering angle of the initially mistuned blade in the hot state,
c) checking whether the difference between the resulting staggering angle in the hot state and the staggering angle of the nominal blade in the hot state is zero except for a residual error,
d) if not, adjusting the amount of change in the staggering angle of the initially mistuned blades in the cold state (wherein the adjustment may involve increasing or decreasing the amount),
e) repeating steps b) to d) until the difference between the staggering angle of the mistuned blade and the staggering angle of the nominal blade in the hot state is zero except for the residual error.

It can be provided here that the staggering angle of the mistuned blade in the cold state is changed by an amount equal to the difference between the staggering angles of the mistuned blade and the nominal blade in the hot state.

A further embodiment of the invention provides that the parameter of the initially mistuned blade, the value of which differs from the corresponding parameter value for the nominal blade in the hot state, is determined for all profile elements and a correction of this parameter in the initially mistuned blade is carried out for all profile elements. The correction of the initially mistuned blades according to the invention can be carried out for some or all of the profile elements.

When correcting the staggering angle of the profile elements of the initially mistuned blade in the cold state, one embodiment provides for the staggering angle to be changed or corrected to a greater extent as the span increases. The correction of the staggering angle can be linearly dependent here on the span or radial height of the blade or otherwise dependent on the span or radial height. This is due to the fact that an impeller typically straightens up and deforms to a lesser extent adjacently to the hub region in the hot state than radially outer regions of the impeller blade.

A further embodiment of the invention provides that, as a further parameter of the initially mistuned blade, the center of gravity of the initially mistuned blade is determined for at least some of the profile elements and compared with the center of gravity of the corresponding profile element of the nominal blade. If the centers of gravity differ here, the center of gravity of the profile element of the initially mistuned blade is shifted by shifting the profile element to the center of gravity of the nominal blade in the cold state. This aspect of the invention is based on the idea of restoring the center of gravity of a profile element that has changed due to the change in thickness or the associated addition or removal of mass, in the sense that the center of gravity of the profile element is shifted back to the center of gravity that the profile element has in the nominal blade. This variant of the invention reduces a change in shape of the blade in the hot state, which is caused by the change in thickness.

The center of mass of a profile element is considered to be its center of gravity. If the mass distribution within a profile element is homogeneous, the center of mass corresponds to the center of area of the profile element.

It may be provided that the respective profile element is shifted in the axial direction and/or in the circumferential direction in order to shift the center of gravity of the initially mistuned blade. The axial direction refers here to the axial direction of a turbomachine, such as a gas turbine engine, in which the blade and the impeller on which the blade is arranged are located. The circumferential direction refers to the direction of rotation of the impeller on which the blade is arranged.

It should be noted that a shift in the center of gravity can be determined in the cold state of the initially mistuned blade and the nominal blade. It is therefore not necessary to consider the hot state in order to change or correct this parameter.

A further embodiment provides that the center of gravity of the profile elements of the initially mistuned blade is compared with the center of gravity of the corresponding profile element of the nominal blade for at least those profile elements for which the initially mistuned blade realizes a change in thickness with respect to the nominal blade, and for these profile elements the center of gravity is shifted to the center of gravity of the corresponding profile element of the nominal blade. This design is based on the aspect that a correction of the center of gravity is only necessary for those profile elements for which a change in thickness has occurred in the mistuned blade.

The initially mistuned blade considered according to the invention differs from a nominal blade by thickness changes that have been made in at least some of the profile elements. However, the type and position of the thickness changes is not relevant to the present invention. In principle, any thickness changes can be made and any methods can be used to determine suitable thickness changes in the overall profile. According to one embodiment, the thickness changes that lead to an initially mistuned blade are made at sensitive regions of the blade in order to achieve the required frequency mistuning in an efficient manner. For example, to determine efficient thickness changes, the difference between the distortion energy and the kinetic energy of an excited nominal blade is determined and the thickness of the nominal blade is increased or decreased depending on the determined difference between the distortion energy and the kinetic energy in a considered region. Such a determination of the change in thickness for tuning a nominal blade is described in the above-mentioned publication P. Gudmundson: "Tuning of Turbine Blades: A Theoretical Approach", Journal of Engineering for Power, ISSN 0022-0825, Vol. 105, No. 2, pp. 249-255, 1983.

A further embodiment provides for a change in thickness in the initially mistuned blade exclusively on the pressure side of the blade. The suction side, on the other hand, remains substantially unaffected by a change in thickness, so that the curvature of the suction side remains unchanged. This prevents negative effects on the rotor performance.

One embodiment of the invention provides for the method according to the invention to be carried out as a computer-implemented method, wherein the individual method steps are calculated and the final shape of the mistuned blade is only produced after it has been determined. The performance of such calculations is known to a person skilled in the art and is carried out, for example, using the finite element method. Once the final shape of the mistuned blade has been calculated, it can then be manufactured using the determined parameters in a manner known per se (for example by casting, manufacturing from composite material, sintering, forging, milling or 3D printing).

In a further aspect of the invention, the present invention relates to a further method for determining the shape of a mistuned blade of an impeller of a turbomachine. The method comprises the steps of:

- providing a nominal blade which has multiple radially threaded-on profile elements,
- providing an initially mistuned blade which has multiple radially threaded-on profile elements, the initially mistuned blade having a reduced or increased thickness at at least one of the profile elements compared with the nominal blade,
- determining the center of gravity of at least the profile elements of the initially mistuned blade with reduced or increased thickness,
- determining the center of gravity of the profile elements for the corresponding profile elements of the nominal blade,
- comparing the centers of gravity of the profile elements of the initially mistuned blade and the nominal blade,
- if the centers of gravity are different, shifting the centers of gravity of the profile elements of the initially mistuned blade to the centers of gravity of the corresponding profile elements of the nominal blade in the cold state of the initially mistuned blade. The centers of gravity are shifted here by shifting the profile elements. Here, the initially mistuned blade forms a final mistuned blade with the profile elements shifted with respect to the center of gravity.

This aspect of the invention provides for restoring the center of gravity of a profile element that has changed due to the change in thickness or the associated addition or removal of mass, in the sense that the center of gravity of the profile element is shifted back to the center of gravity that the profile element has in the nominal blade. This prevents an imbalance of the blade in the hot state caused by the change in thickness. The center of gravity of the profile element can be determined here in the cold state.

It also applies to this aspect of the invention that the method according to the invention can be embodied as a computer-implemented method, wherein the individual method steps are calculated and the final shape of the mistuned blade is only produced after it has been determined.

In a further aspect of the invention, the present invention relates to a blade for an impeller of a turbomachine. The blade is produced by carrying out steps of a method as disclosed herein and then producing the blade according to the shape determined by the method steps.

With the exception of the final step of producing the blade, all production steps can be computer-implemented. The blade is produced in a known manner, for example by casting, manufacturing from composite material, sintering, forging, milling or 3D printing.

In a further aspect of the invention, the present invention relates to an impeller of a turbomachine which has:

- multiple blades arranged adjacently to each other in the circumferential direction of the impeller,
- wherein the blades form a first group and at least one further group of blades,
- wherein the blades of the first group are nominal blades, and
- wherein the blades of the at least one further group are blades according to the invention according to the present disclosure.

The blades A of the first group and the blades B of the at least one further group can be arranged here in one of the following sequences, for example: AB, 2A2B, 4A2B, 3A2B, 3A1B. If blades C of a third group are also present (which are, for example, mistuned in a different way than the blades B), a sequence 2A1B2C can be realized, for example, wherein the aforementioned sequences are to be understood merely as examples.

The impeller may furthermore have an even or odd number of blades.

In a further aspect of the invention, the present invention relates to a gas turbine engine having an impeller according to the invention. The impeller according to the invention is, for example, a fan, an impeller in a compressor stage or an impeller in a turbine stage of a gas turbine engine.

It is pointed out that the present invention is described with reference to a cylindrical coordinate system which has the coordinates x, r, and φ. Here, x indicates the axial direction, r indicates the radial direction, and φ indicates the angle in the circumferential direction. The axial direction is in this case identical to the machine axis of a gas turbine engine in which the blade or the impeller is arranged. Proceeding from the x-axis, the radial direction points radially outward. Terms such as "in front of", "behind", "front", and "rear" relate to the axial direction or the flow direction in the gas turbine engine. Terms such as "outer" or "inner" relate to the radial direction.

The invention will be explained in greater detail below by means of a plurality of exemplary embodiments and with reference to the figures of the drawing, in which.

Figure 3:
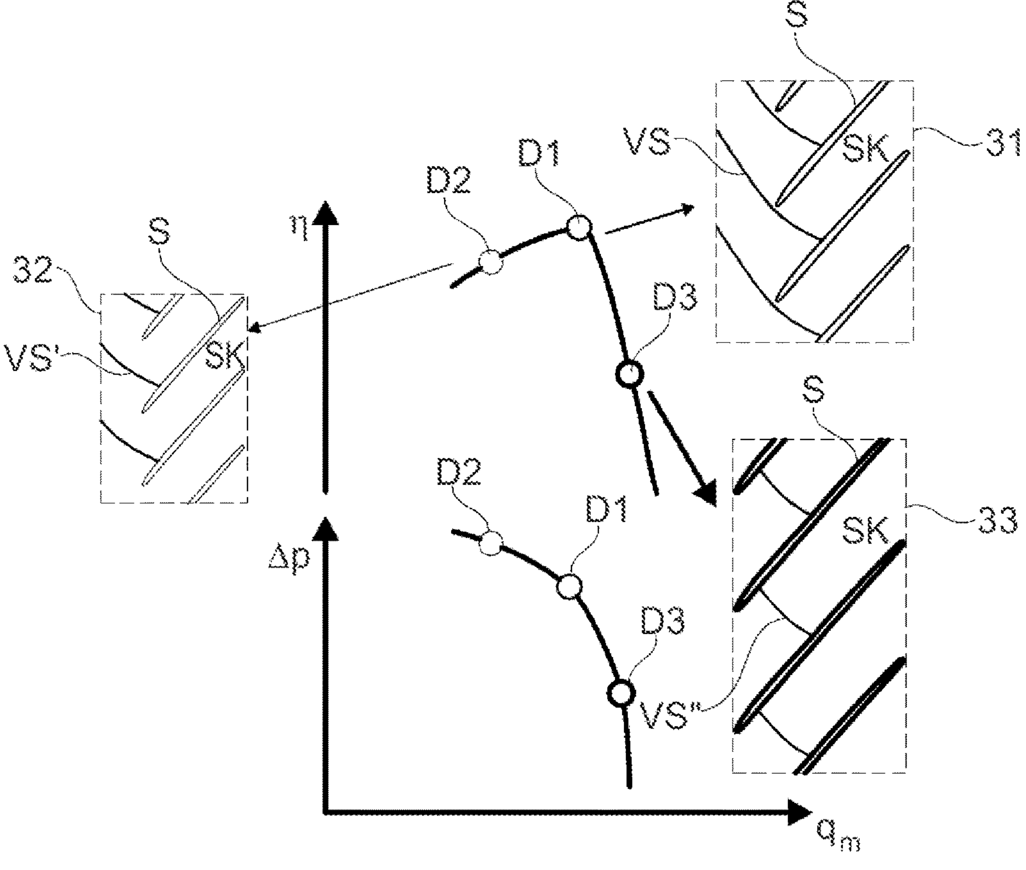
Figure 4:
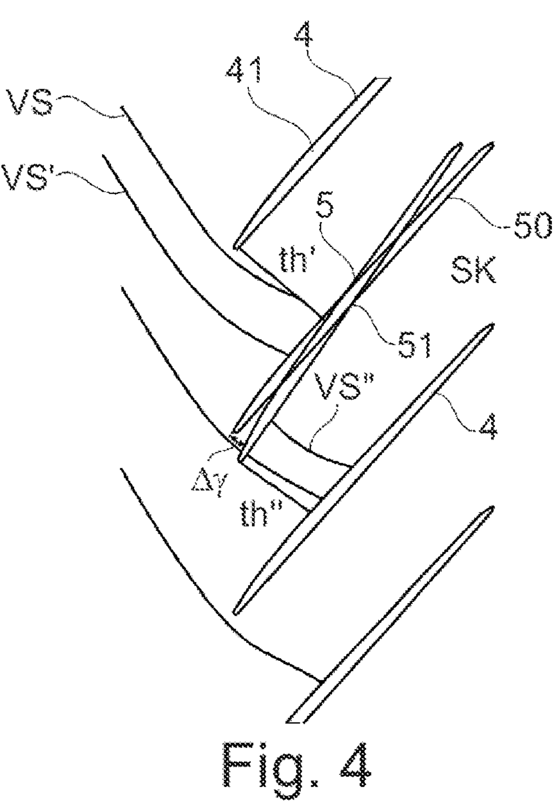
Figure 5:
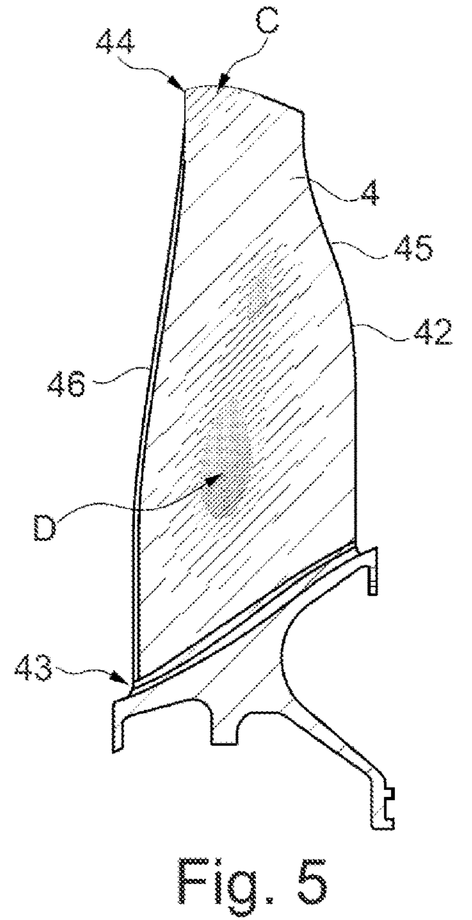
Figure 6:
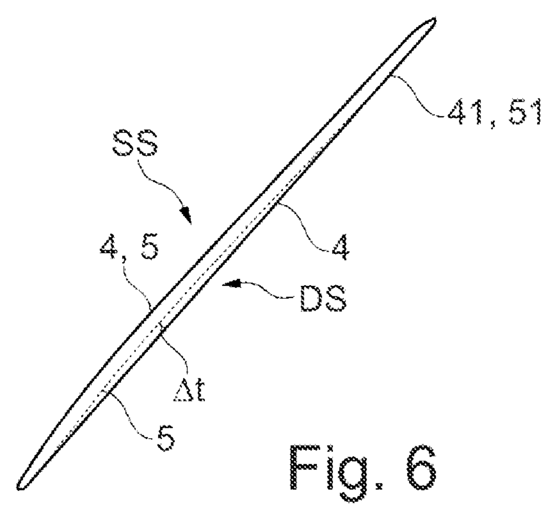
Figure 7:
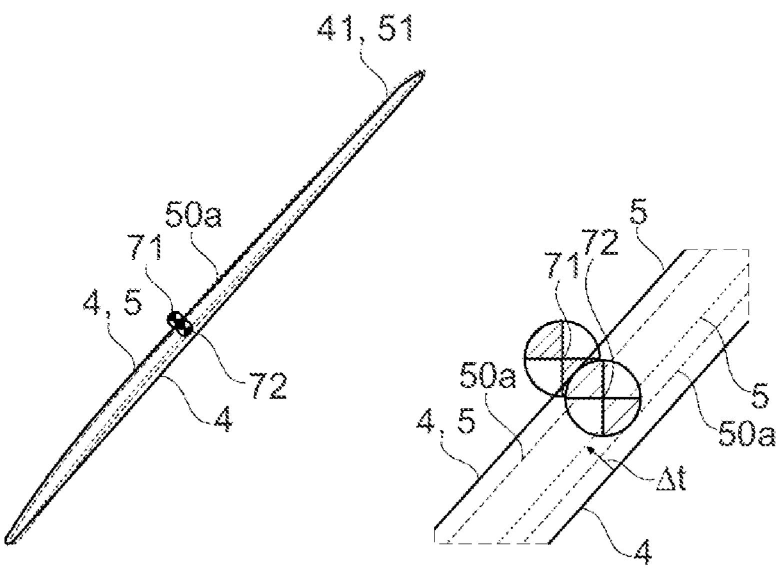
Figure 8:
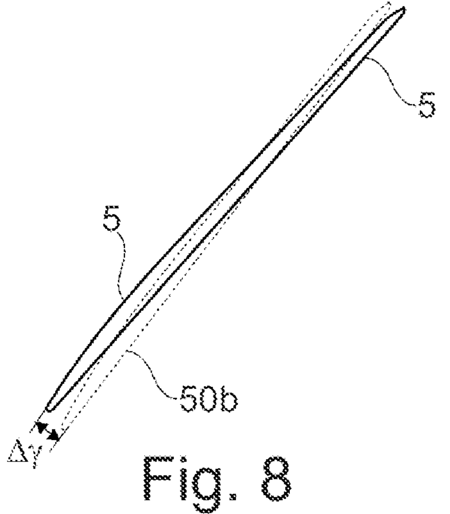
Figure 9:
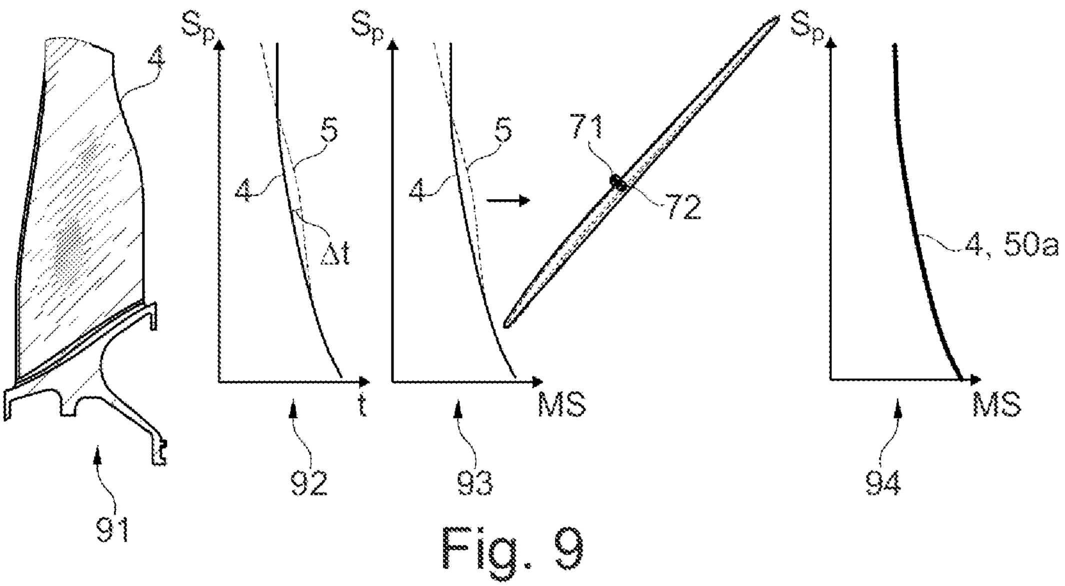
Figure 10:
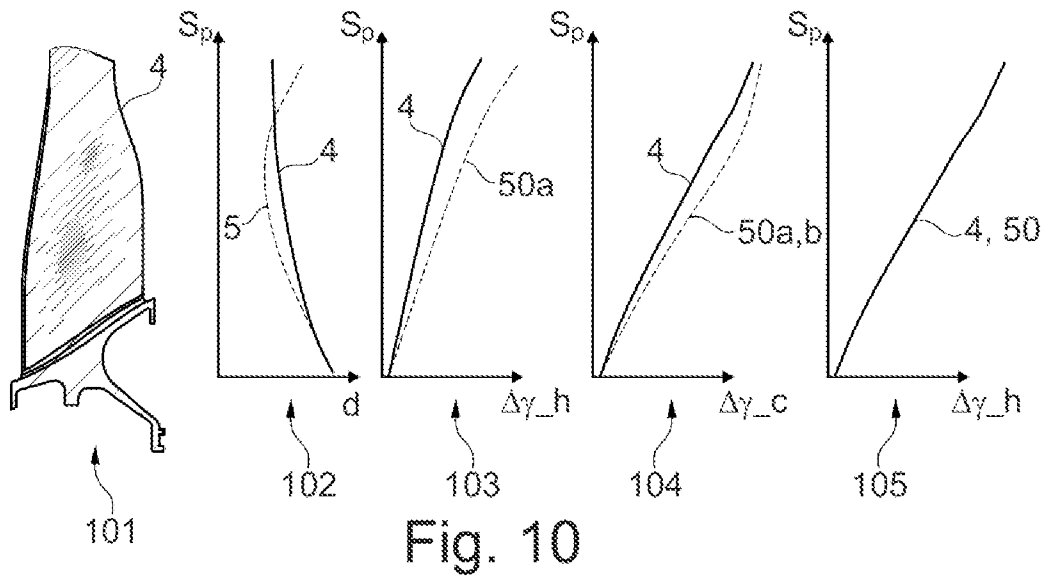
Figure 11:
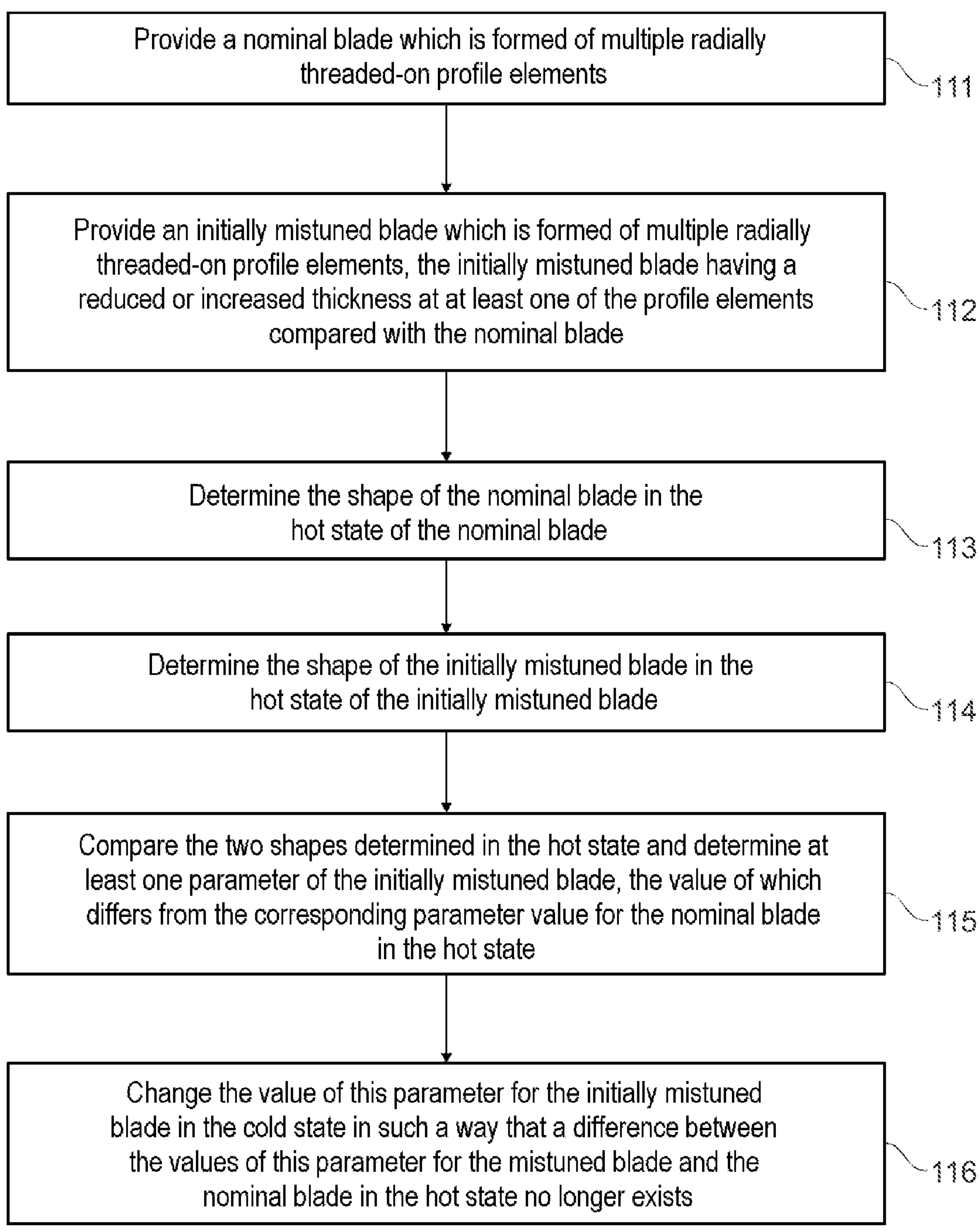
Figures 12, 13:
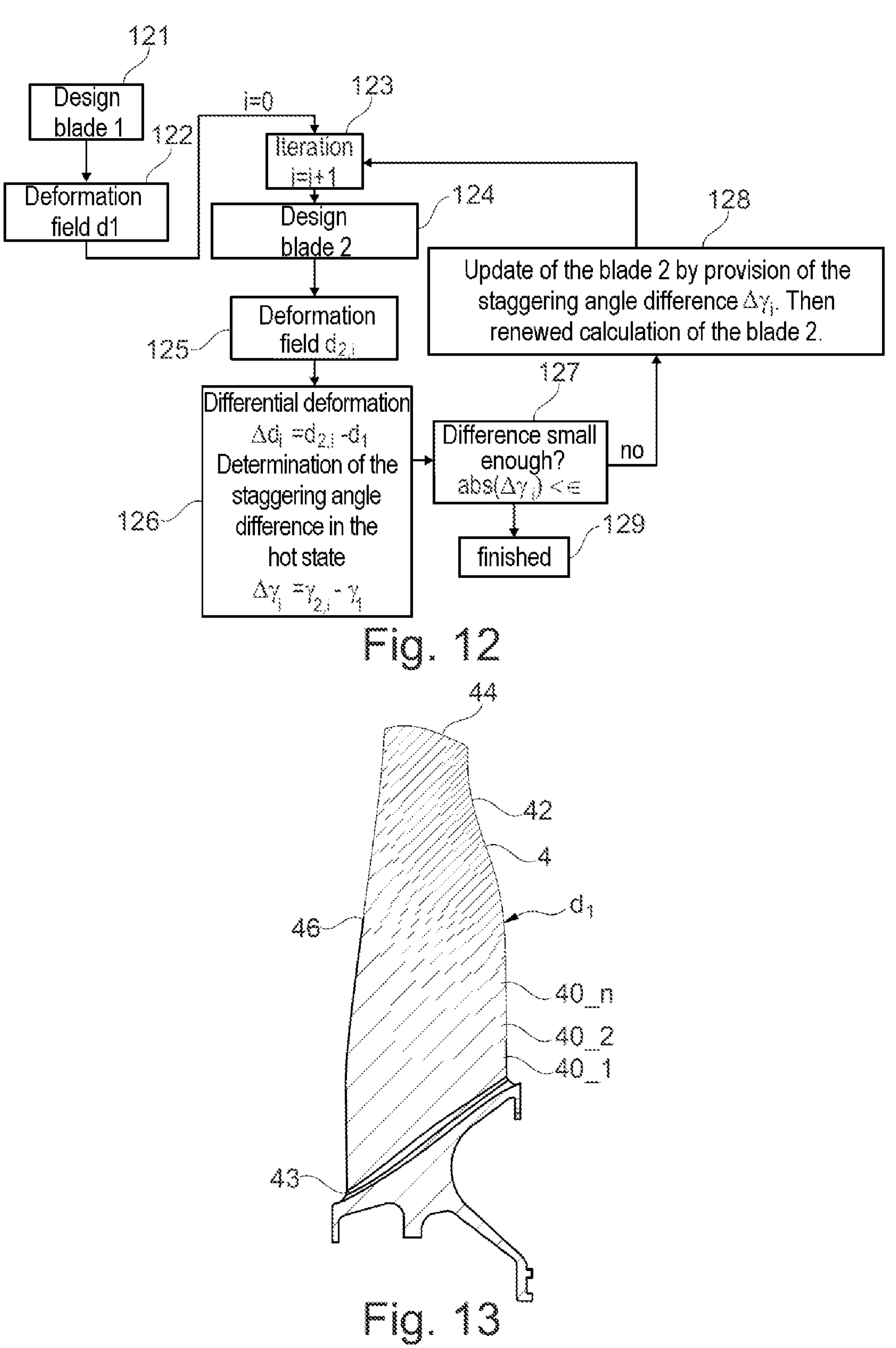
Figure 14:
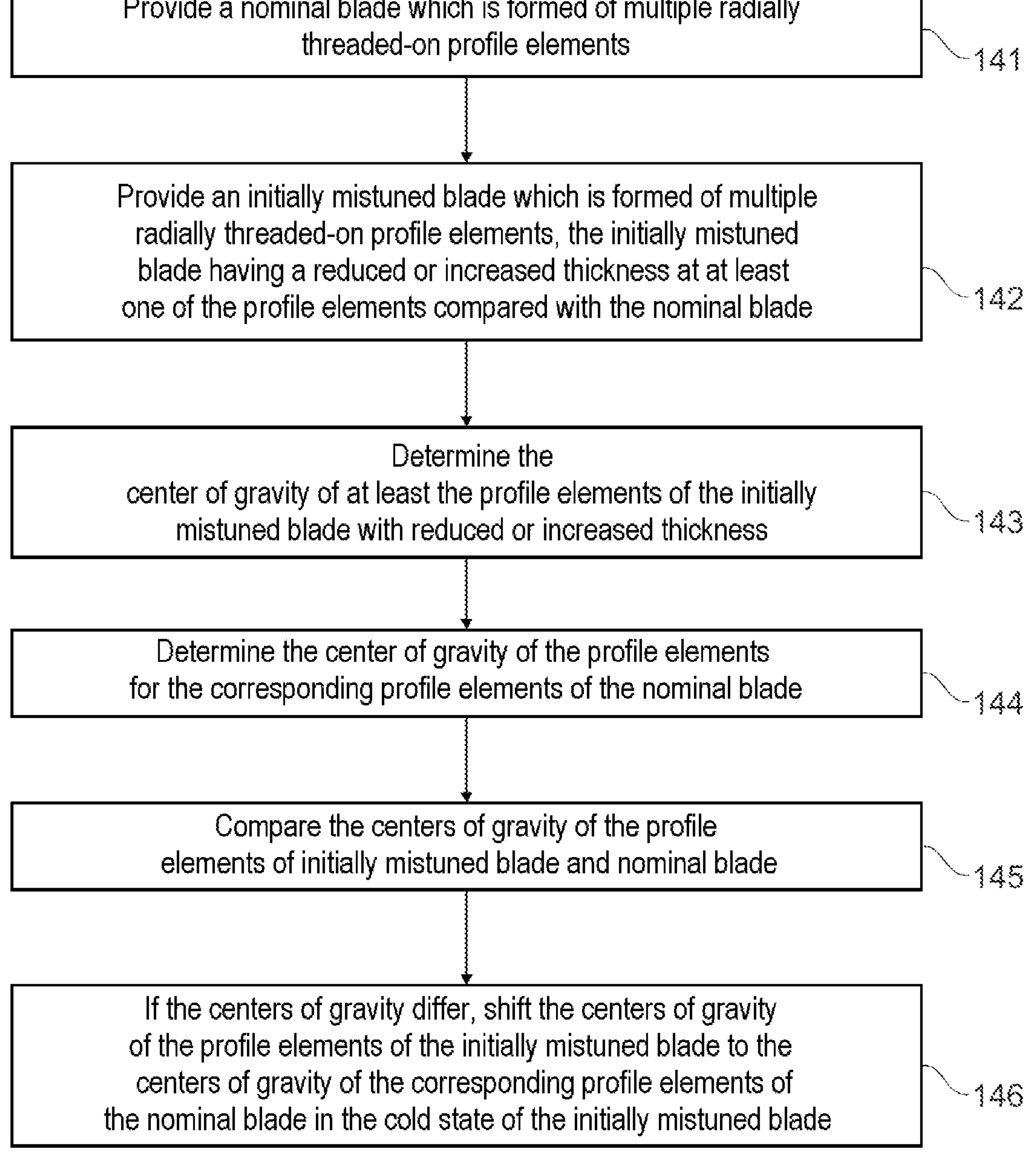

FIG. **2*a*** shows two adjacent compressor blades in the circumferential direction, showing the blade channel between them and the narrowest cross-section of the blade channel;

FIG. 3 shows the dependence of the course of compression shocks on the mass flow through the blade passage between two impeller blades of a transonic blade grid;

FIG. 4 shows schematically blades of a blade grid in the hot state, wherein one of the impeller blades has a changed shape due to a thickness modification in the hot state of the blades;

FIG. 5 shows an impeller blade with an exemplary representation of regions that can undergo a change in thickness for effective mistuning of the blade;

FIG. 6 shows schematically the superimposed profile elements of a nominal blade and a blade with modified thickness;

FIG. 7 shows two superimposed profile elements, wherein one profile element represents the profile element of the initially mistuned blade and the other profile element represents the profile element corrected in respect of its center of gravity;

FIG. 8 shows two superimposed profile elements, wherein one profile element represents the profile element of the initially mistuned blade and the other profile element represents the profile element corrected in respect of its staggering angle;

FIG. 9 shows a sequence representing a correction of the centers of gravity of the profile elements of an initially mistuned blade as a function of the blade height;

FIG. 10 shows a sequence representing a correction of the staggering angles of the profile elements of an initially mistuned blade as a function of the blade height;

FIG. 11 shows a flow chart of a method for determining the shape of a mistuned blade of an impeller with correction of the staggering angle;

FIG. 12 shows a flow chart of a method for determining the shape of a mistuned blade of an impeller with correction of the staggering angle, which is carried out iteratively;

FIG. 13 shows, by way of example, a deformation field of an impeller blade; and FIG. 14 shows a flow chart of a method for determining the shape of a mistuned blade of an impeller by correcting the center of mass of the profile elements.

Figure 1:
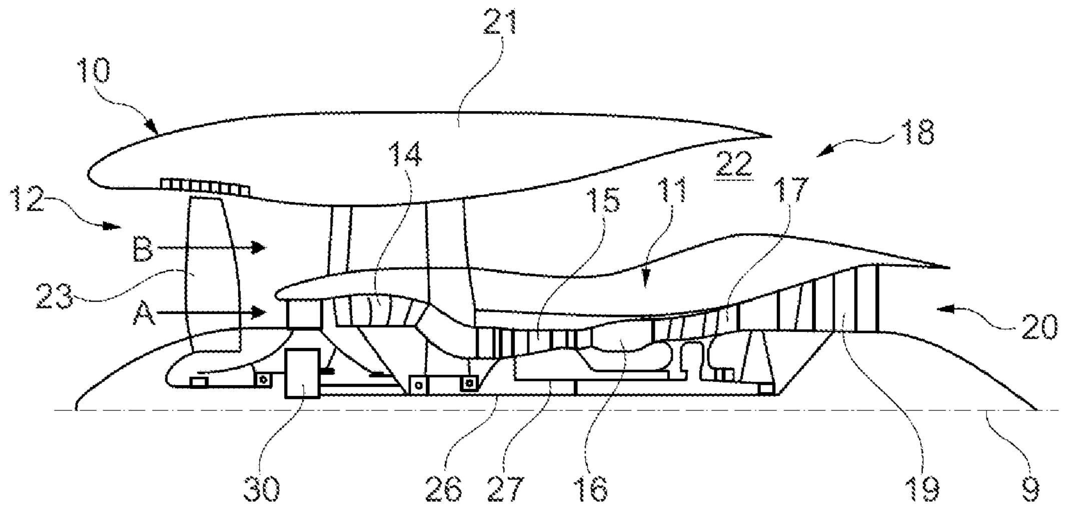
FIG. 1 shows a sectional side view of a gas turbine engine in which the present invention can be implemented.

FIG. 1 illustrates a gas turbine engine 10 having a main rotation axis 9. The engine 10 comprises an air intake 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear box 30.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before they are expelled through the nozzle 20 to provide a certain thrust. The high-pressure turbine 17 drives the high-pressure compressor 15 by means of a suitable connecting shaft 27. The fan 23 generally provides the major part of the thrust force. The epicyclic gear box 30 is a reduction gear box.

It is noted that the terms "low-pressure turbine" and "low-pressure compressor" as used herein can be taken to mean the lowest-pressure turbine stage and the lowest-pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

The geometry of the gas turbine engine 10, and components thereof, is/are defined by a conventional axis system, which comprises an axial direction (which is aligned with the rotation axis 9), a radial direction (in the direction from bottom to top in FIG. 1), and a circumferential direction (perpendicular to the view in FIG. 1). The axial, radial and circumferential directions are perpendicular to one another.

In the context of the present invention, the design of the blades of at least one impeller of a gas turbine engine is of importance, wherein it can be a gas turbine engine according to FIG. 1 or any other gas turbine engine, for example one that does not have a transmission 30. The impeller may be the fan, an impeller of a compressor or an impeller of a turbine.

Figure 2:
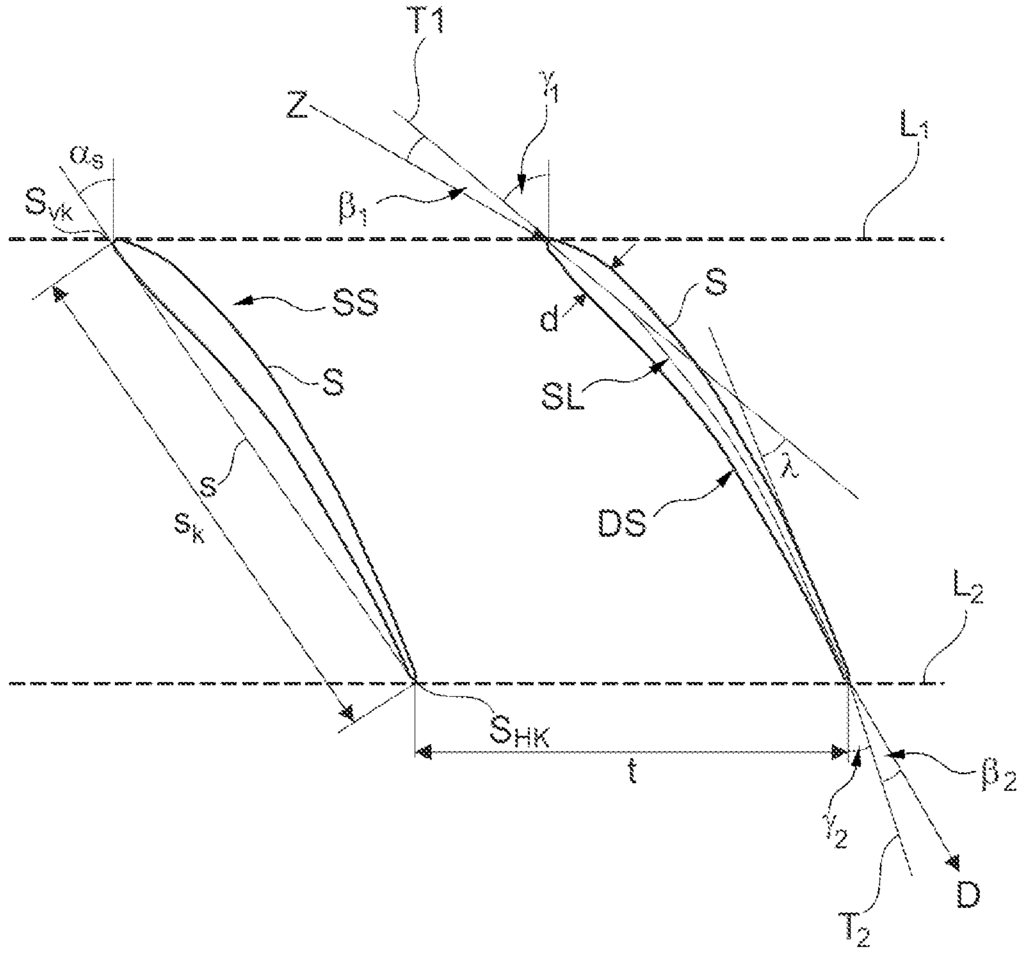
FIG. 2 shows the basic geometrical construction and the basic designations in a compressor cascade.

The basic construction of a compressor cascade will firstly be described on the basis of FIG. 2. The compressor cascade is illustrated in a conventional illustration in meridional section and in a developed view. Said compressor cascade comprises a multiplicity of blades S, which each have a leading edge $S_{VK}$ and a trailing edge $S_{HK}$. The leading edges $S_{VK}$ lie on an imaginary line $L_1$, and the trailing edges $S_{HK}$ lie on an imaginary line $L_2$. The lines $L_1$ and $L_2$ run parallel. The blades S furthermore each comprise a suction side SS and a pressure side DS. Their maximum profile thickness is denoted by d.

The compressor cascade has a cascade pitch t and a profile chord s with a profile chord length $s_k$. The profile chord s is the connecting line between the leading edge $S_{VK}$ and the trailing edge $S_{HK}$ of the profile. The blade staggering angle (hereinafter referred to as staggering angle) $\alpha_s$ is formed between the profile chord s and the perpendicular to the line $L_1$ (wherein the perpendicular at least approximately corresponds to the direction defined by the machine axis). The staggering angle $\alpha_s$ indicates the inclination of the blades S.

The blades S have a camber line SL, which is also referred to as profile centerline. This is defined by the connecting line of the circle center points inscribed into the profile. The tangent to the camber line SL at the leading edge is denoted by $T_1$. The tangent to the camber line SL at the trailing edge is denoted by $T_2$. The angle at which the two tangents $T_1$, $T_2$ intersect is the blade camber angle $\lambda$. The inflow direction, at which the gas flows into the cascade, is denoted by Z, and the outflow direction, at which the gas flows away from the cascade, is denoted by D. The incidence angle $\beta_1$ is defined as the angle between the tangent $T_1$ and the inflow direction Z. The deviation angle $\beta_2$ is defined as the angle between the tangent $T_2$ and the outflow direction A.

Furthermore, the blade entry angle $\gamma_1$ is defined as the angle between the tangent $T_1$ to the camber line SL and the perpendicular to the line $L_1$. A blade exit angle $\gamma_2$ is defined as the angle between the tangent $T_2$ to the camber line SL and the perpendicular to the line $L_2$. The blade entry angle $\gamma_1$ is also referred to as airfoil entry angle or as inflow metal angle and the blade exit angle $\gamma_2$ is also referred to as airfoil exit angle or as outflow metal angle.

The blade entry angle $\gamma_1$ and the blade exit angle $\gamma_2$ both change if the staggering angle $\alpha_s$ is changed in the case of an unchanged shape of the blades, because a change in the staggering angle $\alpha_s$ in such a situation, owing to the associated adjustment of the inclination of the blades, changes the orientation of the tangents $T_1$, $T_2$.

Figure 2A:
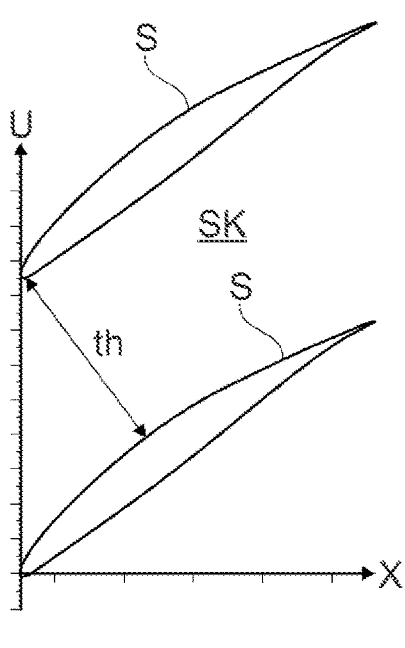

A blade channel SK is formed between two adjacent blades S. This channel has a narrowest cross-section th. This is shown schematically and as an example in FIG. 2*a*.

FIG. 3 illustrates the disadvantages that arise when the narrowest cross-section th between the blades S of a blade row is outside the optimum. FIG. 3 shows here the pressure ratio $\Delta p$ between the suction side and pressure side of a blade on the one hand and the efficiency $\eta$ as a function of the mass flow $q_m$ on the other. The point D1 denotes the optimum or optimal design of the narrowest cross-section of the blade channel SK, as is the case with nominal blades. The optimum design D1 corresponds to the partial representation 31. The compression shocks VS occurring run close to the leading edge of the respective adjacent blade S. The efficiency η is optimum if the shock is close to the leading edge.

Point D2 corresponds to a design in which the narrowest cross-section of the blade channel SK is smaller than at D1. The point D2 corresponds to the partial representation 32. The mass flow $q_m$ through the blade channel SK is reduced and the efficiency η is also reduced. The compression shocks VS' have moved forward or have been discharged. Point D3 corresponds to a design in which the narrowest cross-section of the blade channel SK is larger than at D1. Although the mass flow $q_m$ through the blade channel SK is increased, the efficiency η is reduced. Point D3 corresponds to the partial representation 33. The compression shocks VS" have migrated into the blade passage SK or have been swallowed there.

The aim is to always place the narrowest cross-section of the blade channel SK in the optimum D1. The narrowest cross-section of the blade channel SK depends here on the staggering angle.

FIG. 4 illustrates by way of example the consequences that can occur when a blade rotates in the hot state, i.e., when the impeller to which it is attached rotates, straightens up and thereby changes its staggering angle. Such a change in the staggering angle can occur if the blade under consideration is not a nominal blade, but a mistuned blade which has a reduced or increased thickness in relation to at least one of its profile elements. For example, FIG. 4 shows nominal blades 4 and initially mistuned blades 5, which have a region with a thickness that differs from that of the nominal blades (not visible in FIG. 4). If such initially mistuned blades 5 straighten up and untwist in the hot state, the situation can arise in which the staggering angle γ changes. FIG. 4 shows the change in the staggering angle Δγ with an initially mistuned blade 5 and an associated change in the smallest cross-section th', th" in the two adjacent blade channels SK. The compression shocks VS', VS" move axially forward in the blade channel with the increased smallest cross-section th' compared to the compression shocks VS of the nominal blades 4 and are swallowed up in the blade channel with the reduced smallest cross-section th". As shown in FIG. 3, the result is reduced efficiency in both cases.

FIG. 4 thus illustrates that changes to the aerodynamic profile (in this case the staggering angle) impair efficiency. Furthermore, the shifting of the compression shocks can lead to additional noise generation.

The invention therefore aims to change the initially mistuned blades 5 in the cold state, i.e., when the impeller to which it is attached is not rotating, in such a way that in the hot state it forms the same narrowest cross-section th and has the same staggering angle γ as the nominal blades 4. In such a case, the initially mistuned blade 5 assumes the shape 50 after its corresponding correction in the hot state.

It should be noted that FIG. 4 shows each of the blades 4, 5 with respect to a profile element 41, 51. A profile element 41, 51 corresponds here to a profile section of the blade 4, 5, wherein the term “profile element” makes it clear that this is not an infinitesimally thin section, but a section of finite thickness, so that the blade 4, 5 is threaded through a plurality of profile elements 41, 51.

The illustrated change in the staggering angle and the narrowest cross-section of the blade channel can vary depending on the span or radial height of the blade, as will be explained with reference to FIG. 10. A change in the staggering angle near the hub is less pronounced here than towards the tip of the blade.

FIG. 5 shows a nominal blade 4, wherein the blade 4 is an example of a fan blade. The blade has a front edge 46, a rear edge 42, a hub region 43 and a blade tip region 44 in a manner known per se. It comprises a blade face 45 with a pressure side and a suction side.

Regions C, D are also shown, in which a change in the thickness of the blade 4 leads to a particularly effective mistuning or change in the natural frequency of the impeller blade 4. Targeted mistuning is carried out in order to reduce certain vibration excitations of the impeller. The present invention does not consider the way in which the thickness of the blade 4 is changed. It assumes that a change in thickness has taken place. A nominal blade 4 that has undergone a change in thickness for a targeted mistuning is referred to as an initially mistuned blade 5.

A number of measures and methods are known for a targeted change in thickness. One variant in this regard provides for determining the difference between the distortion energy and the kinetic energy of an excited nominal blade 4 and increasing or decreasing the thickness of the nominal blade 4 depending on the determined difference between the distortion energy and the kinetic energy in a considered region. In particular, the thickness of the blade is increased or reduced in those regions in which said difference is particularly large.

For example, area C in FIG. 5 indicates a region of increased kinetic energy after excitation of the blade. The region D of FIG. 5 indicates a region of increased distortion energy following excitation of the blade. Thickness changes in these regions can lead to a targeted change in the natural frequency of the blade 4 in a particularly effective manner. This is described in principle in P. Gudmundson: “Tuning of Turbine Blades: A Theoretical Approach”, Journal of Engineering for Power, ISSN 0022-0825, Vol. 105, No. 2, pp. 249-255, 1983. In particular, Formula 30 of this publication describes how to determine the difference between the distortion energy and the kinetic energy on the surface of a structure.

According to one variant, a change in thickness is carried out here in such a way that it only takes place on the pressure side of a blade. This is because the performance of the transonic portion of a fan in particular depends mainly on the curvature of the suction side, so it is important to maintain this. On the other hand, this leads to a certain imbalance of the blade, which increases the deformation of the blade in the hot state.

FIG. 6 shows a superimposed nominal blade 4 and a thickness-reduced and therefore mistuned blade 5, on the basis of profile elements 41, 51 respectively, wherein the mistuned blade 5 has a thickness reduced by Δt on the pressure side DS. On the suction side SS, the profiles are identical. For example, the mistuned blade 5 is created from a nominal blade 4 as shown in FIG. 5 by changing the thickness in the region D of FIG. 5.

Before the aforementioned change in the staggering angle of the mistuned blade 5 is discussed with reference to FIG. 8, FIG. 7 is used to discuss a further measure that can prevent or at least reduce an undesirable change in the design of the mistuned blade 5 in the hot state as shown in FIG. 4.

It should first be noted that each profile element 41, 51 has a center of mass. With a homogeneous mass distribution, this corresponds to the center of gravity of the profile section. If the thickness of a nominal blade 4 is now changed in certain regions as shown in FIG. 6, this leads to a changed center of mass. FIG. 7 shows an enlargement of the central region of the left-hand illustration in the right-hand illustration of FIG. 7, which indicates the center of mass. The nominal blade 4 for example has a center of mass 72. After reducing the thickness Δt, the initially mistuned blade 5 has a changed center of mass 71, which is shifted relative to the center of mass 72.

It is now provided that the thickness-reduced profile element is shifted in such a way that its center of mass is again located on the center of mass 72, so that the center of mass 72 of the nominal blade 4 and the center of mass 71 of the initially mistuned blade, which is then corrected with regard to its center of mass, lie on top of one another, wherein the initially mistuned blade 5, which is corrected with regard to its center of mass, is referred to as blade 50*a*.

Such a correction, which is made by calculation before the blade is then produced, can be made for all profile elements 51 for which a change in thickness has been made. It should be noted that the centers of mass 71, 72 and the shifting of the center of mass of the initially mistuned blade 5 to the corrected blade 50*a* can be determined when the blade is in the cold state.

FIG. 8 shows the change in the staggering angle of the initially mistuned blades 5 by a value Δγ. This change takes place in the cold state of the initially mistuned blade 5. The initially mistuned blade 5, which is corrected with regard to the staggering angle, is referred to as blade 50*b*. It should be noted that the change in the staggering angle is generated by rotating the profile element about an axis. Here, the axis of rotation can pass through the center of mass of the profile element, although this is not necessarily the case.

The changes to the initially mistuned blade 5 with regard to the center of mass according to FIG. 7 (wherein the corrected mistuned blade 50*a* is created) and with regard to the staggering angle according to FIG. 8 (wherein the corrected mistuned blade 50*b* is created) result in a final mistuned blade 50 which, according to FIG. 4, has the same shape as the nominal blades 4 in the hot state.

FIG. 9 shows a change in thickness as shown in FIG. 7 as a function of the span Sp of the blade, which corresponds to the radial height of the blade. The left-hand partial representation 91 shows here the nominal blade 4 according to FIG. 5. This undergoes a change in thickness for targeted mistuning. The corresponding change in thickness is shown in the partial representation 92, which shows the thickness t as a function of the span Sp. The course of the blade thickness is shown both for the nominal blades 4 and for the initially mistuned blade 5. In certain radial regions, there is a change in thickness Δt of the initially mistuned blade 5 compared to the nominal blade 4. Here, the initially mistuned blade 5 has an increased thickness in a central region and a reduced thickness in the upper region.

Sub-illustration 93 shows a shift in the center of mass MS as a function of the span Sp. The degree of shift corresponds to the change in thickness as shown in sub-illustration 92. This is due to the fact that in profile elements in which a large change in thickness has occurred, the corresponding profile element is corrected accordingly in its center of mass. In profile elements that have not undergone a change in thickness, no correction of the center of mass is required.

The sub-illustration 94 shows the centers of mass MS of the nominal blade 4 and the initially mistuned blade 50*a*, and then corrected with regard to the center of mass, as a function of the span Sp. The centers of mass of nominal blade 4 and corrected blade 50*a* are identical.

FIG. 10 shows a corresponding sequence with regard to the correction of the staggering angle. The sub-illustration 101 shows the nominal blade 4, which undergoes a change in thickness for targeted mistuning. The sub-illustration 102 shows the deformation d of the blade as a function of the span Sp. According to the sub-illustration 103, this deformation corresponds to a change in the staggering angle that the mistuned blade undergoes in the hot state. The staggering angle Δγ_h in the hot state is shown here as a function of the span Sp. The sub-illustration 103 shows the mistuned blade here after a correction according to FIG. 9, which is why the curves for the blades 4, 50*a* are compared. However, this is merely optional. In principle, the correction of the staggering angle can also be carried out without correcting the centers of gravity. It can be seen that the change in the staggering angle Δγ_h in the hot state increases as the span increases.

The sub-illustration 104 shows the correction of the staggering angle Δγ_c in the cold state of the mistuned blade 50*a,b*. The staggering angle Δγ_c is corrected here over the entire span and therefore for all profile elements. The sub-illustration 105 shows the staggering angle Δγ_h in the hot state both for the nominal blade and for the initially mistuned and subsequently doubly corrected blade 50 (see also blade 50 in FIG. 4). The initially mistuned blade 5 is corrected twice, namely firstly with regard to the centers of mass of the individual profile elements and secondly with regard to the staggering angle of the individual profile elements. The desired result is achieved, namely that the staggering angles Δγ_h of the nominal blade 4 and the final corrected blade 50 do not differ.

FIG. 11 shows the main method steps for determining the shape of the mistuned blade, wherein the initially mistuned blade undergoes an additional change or correction. According to step 111, a nominal blade is first provided. This comprises multiple radially threaded-on profile elements. Further, in step 112, an initially mistuned blade is provided, which likewise comprises multiple radially threaded-on profile elements. Here, the initially mistuned blade has a reduced or increased thickness compared to the nominal blade at at least one of the profile elements. For example, such a change in thickness is realized in certain regions on the pressure side of the blade.

In steps 113, 114, the shape of the nominal blade and the shape of the initially mistuned blade in the hot state are now determined. This can be done using calculations according to the finite element method, for example. The two shapes determined in the hot state are then compared with each other in step 115. If present, at least one parameter of the initially mistuned blade is determined, the value of which differs from the corresponding parameter value of the nominal blade in the hot state. As explained, this parameter is, for example, the staggering angle of the blade.

In step 116 the value of this parameter for the initially mistuned blade in the cold state is changed in such a way that a difference between the values of this parameter for the mistuned blade and the nominal blade in the hot state no longer exists. For example, the staggering angle of the initially mistuned blade in the cold state is changed in such a way that in the hot state the shapes 4, 50 corresponding to FIG. 4 and corresponding to the sub-illustration 105 of FIG. 10 coincide.

The method described in FIG. 11 can be carried out iteratively in one embodiment. This is shown by way of example in FIG. 12. Then, in step 121, a nominal blade with a nominal design is first provided, referred to as blade 1. In step 122, the deformation field d1 in the hot state of the blades is calculated for the nominal blade. Such a deformation field d1 is illustrated by way of example in FIG. 13. The deformation field comprises different regions 40-*n* in which the nominal blade 4 is deformed differently in the hot state. For example, in a region 40_1 adjacent to the hub 43, it has substantially no deformation and the deformation increases in the adjoining regions 40-*n* towards the blade tip 44 and towards the trailing edge 42.

In step 123, the index i is now increased by the value 1. Furthermore, in step 124, the initially mistuned blade is provided, which has changes in thickness compared to the nominal blade. This is referred to as blade 2. The deformation field $d_{2,i}$ in the hot state is also calculated for the blade 2 in step 125. The deformation field differs here from the deformation field d1 according to FIG. 13 of the nominal blade, i.e., the initially mistuned blade has a different shape in the hot state than the nominal blade. In step 126, the differential deformation $\Delta d_i = d_{2,i} - d_1$ is determined and the difference in the staggering angle in the hot state is calculated for the individual profile elements: $\Delta\gamma_i = \gamma_{2,i} - \gamma_1$. In step 127 it is checked whether the determined difference is below a residual error ε. As the initially mistuned blade has not yet been corrected, this will typically not be the case. In step 128, the initially mistuned blade is then corrected with regard to the staggering angle difference $\Delta\gamma_i$, i.e., the staggering angle of the initially mistuned blade is changed accordingly in the cold state. The method described is then carried out again in a further iteration step. The design of the blade 2 is recalculated here and the differential deformation and the staggering angle difference are determined again, in accordance with steps 125, 126.

It is then checked again in step 127 whether the determined difference is below the residual error ε. If so, the method according to step 129 is completed, i.e., the final shape of the initially mistuned blades is determined. If not, a further iteration is carried out, etc.

FIG. 14 shows the method steps for determining the shape of a mistuned blade in the event that the centers of gravity are corrected according to FIGS. 7 and 9. Such a correction can be made in addition to a correction of the staggering angle. Alternatively, only the centers of gravity can be corrected.

According to step 141, a nominal blade is first provided. This comprises multiple radially threaded-on profile elements. Further, in step 142, an initially mistuned blade is provided, which likewise comprises multiple radially threaded-on profile elements. Here, the initially mistuned blade has a reduced or increased thickness compared to the nominal blade at at least one of the profile elements.

According to step 143, the center of gravity of the profile elements is determined at least for the profile elements with reduced or increased thickness of the initially mistuned blade. Similarly, in step 144, the center of gravity of these profile elements is determined for the corresponding profile elements of the nominal blade. In step 145, the centers of gravity of the profile elements of the initially mistuned blade and the nominal blade are compared. If the centers of gravity differ, which is typically the case due to the thickness change that has taken place, the centers of gravity of the profile elements of the initially mistuned blade are shifted to the centers of gravity of the corresponding profile elements of the nominal blade in accordance with step 146. This is done in relation to the cold state of the initially mistuned blade. As a result, with regard to the centers of gravity, there is no longer any difference between the nominal blades and the blades that were initially mistuned and then corrected with regard to the centers of gravity. This means that the resulting changes in shape between the nominal blade and the mistuned blade in the hot state are smaller.

The methods according to the invention make it possible to determine the shape of a mistuned blade of an impeller of a turbomachine. One or more such blades together with nominal blades form an overall mistuned blade ring in which vibration excitations of the blade wheel are minimized.

The sequence of different blades in a blade ring can be determined using an optimization program and is not limited to the classic AB pattern. Examples of more complex sequences are AB, 2A2B, 4A2B, 3A2B, 3A1B and 2A1B2C, wherein, for example, blades A of a first group are nominal blades, blades B of a second group are mistuned blades, and blades C of a third group are likewise mistuned blades, but mistuned in a different way than the blades B.

It goes without saying that the invention is not limited to the embodiments described above, and various modifications and improvements can be made without departing from the concepts described here. It is furthermore to be noted that any of the features described can be used separately or in combination with any other features, provided that they are not mutually exclusive. The disclosure extends to and comprises all combinations and sub-combinations of one or more features which are described here and comprises these. If ranges are defined, these ranges therefore comprise all the values within these ranges as well as all the partial ranges that lie within a range.

The invention claimed is:

1. A method for determining a shape of a mistuned blade of an impeller of a turbomachine, comprising the following steps:

providing a nominal blade which has multiple radially threaded-on profile elements, providing an initially mistuned blade which has multiple radially threaded-on profile elements, the initially mistuned blade having a reduced or increased thickness at at least one of the profile elements compared with a thickness of the nominal blade, determining a shape of the nominal blade in a hot state of the nominal blade, determining a shape of the initially mistuned blade in a hot state of the initially mistuned blade, comparing the two shapes determined in the hot state and determining at least one parameter of the initially mistuned blade, a value of which differs from a corresponding at least one parameter for the nominal blade in the hot state, changing a value of the at least one parameter of the initially mistuned blade in a cold state such that a difference between values of the at least one parameter for the initially mistuned blade and the corresponding at least one parameter for the nominal blade in the hot state no longer exists;

wherein the at least one parameter of the initially mistuned blade, which is determined in the hot state, is a staggering angle of at least one profile element of the initially mistuned blade, the staggering angle of the initially mistuned blade being changed in the cold state such that the change in the staggering angle is canceled out in the hot state.

2. The method according to claim 1, wherein the staggering angle of the initially mistuned blade in the cold state is changed, such that in the cold state the staggering angle is changed by an amount by which the staggering angle of the initially mistuned blade in the cold state differs from the staggering angle of the nominal blade in the hot state.

3. The method according to claim 1, wherein the staggering angle of the initially mistuned blade is changed iteratively in the cold state, the method comprising:

a) in a first step, changing the staggering angle of the initially mistuned blade in the cold state by a first amount, b) determining the resultant staggering angle of the initially mistuned blade in the hot state, c) checking whether the difference between the resulting staggering angle in the hot state and the staggering angle of the nominal blade in the hot state is zero except for a residual error, d) if no, adjusting the amount of change in the staggering angle of the initially mistuned blades in the cold state, e) repeating steps b) to d) until the difference between the staggering angle of the mistuned blade and the staggering angle of the nominal blade in the hot state is zero except for the residual error.

4. The method according to claim 3, wherein the staggering angle of the mistuned blade in the cold state is changed by an amount equal to the difference between the staggering angles of the mistuned blade and the nominal blade in the hot state.

5. The method according to claim 1, wherein the at least one parameter of the initially mistuned blade, the value of which differs from the corresponding at least one parameter value for the nominal blade in the hot state, is determined for all profile elements and a correction of the at least one parameter in the initially mistuned blade is carried out for all profile elements.

6. The method according to claim 5, wherein the staggering angle of the profile elements of the initially mistuned blade is changed to a greater extent with increasing span of the initially mistuned blade in the cold state.

7. The method according to claim 1, wherein, as a further parameter of the initially mistuned blade, the center of gravity of the initially mistuned blade is determined for at least some of the profile elements and compared with the center of gravity of the corresponding profile element of the nominal blade, wherein if the centers of gravity differ, the center of gravity of the profile element of the initially mistuned blade is shifted by shifting the profile element to the center of gravity of the nominal blade in the cold state.

8. The method according to claim 7, wherein the respective profile element is shifted in the axial direction and/or in the circumferential direction in order to shift the center of gravity of the initially mistuned blade.

9. The method according to claim 7, wherein the center of gravity of the initially mistuned blade in the cold state is compared with the center of gravity of the corresponding profile element of the nominal blade.

10. The method according to claim 7, wherein the center of gravity of the profile elements of the initially mistuned blade is compared with the center of gravity of the corresponding profile element of the nominal blade for at least those profile elements for which the initially mistuned blade realizes a change in thickness with respect to the nominal blade, and for these profile elements the center of gravity is shifted to the center of gravity of the corresponding profile element of the nominal blade.

11. The method according to claim 1, wherein the provisioning of an initially mistuned blade having a reduced or increased thickness compared to the nominal blade in at least one of the profile elements comprises that the difference between a distortion energy and a kinetic energy of an excited nominal blade is determined and the thickness of the nominal blade is increased or reduced as a function of the determined difference between the distortion energy and the kinetic energy in a region under consideration.

12. The method according to claim 1, wherein a change in thickness of the initially mistuned blade occurs exclusively on the pressure side of the initially mistuned blade.

13. The method according to claim 1, wherein the method is carried out as a computer-implemented method, wherein the individual method steps are calculated and the final shape of the mistuned blade is only produced after the final shape has been determined.

14. A blade for an impeller of a turbomachine, produced by carrying out the steps of the method according to claim 1 and then producing the blade according to the shape determined by the method steps.

15. An impeller of a turbomachine, which has:

multiple blades arranged adjacently to each other in the circumferential direction of the impeller, wherein the blades form a first group and at least one further group of blades, wherein the blades of the first group are nominal blades, and wherein the blades of the at least one further group are blades according to claim 14.

16. The impeller according to claim 15, wherein the blades of the first group and the blades of the at least one further group are arranged in one of the following sequences: AB, 2A2B, 4A2B, 3A2B, 3A1B, 2A1B2C.

17. A method for determining a shape of a mistuned blade of an impeller of a turbomachine, comprising the following steps:

providing a nominal blade which has multiple radially threaded-on profile elements, providing an initially mistuned blade which has multiple radially threaded-on profile elements, the initially mistuned blade having a reduced or increased thickness at at least one of the profile elements compared with the nominal blade, determining a shape of the nominal blade in a hot state of the nominal blade, determining a shape of the initially mistuned blade in a hot state of the initially mistuned blade, comparing the two shapes determined in the hot state and determining at least one parameter of the initially mistuned blade, a value of which differs from a corresponding at least one parameter for the nominal blade in the hot state, changing a value of the at least one parameter of the initially mistuned blade in a cold state such that a difference between values of the at least one parameter for the initially mistuned blade and the corresponding at least one parameter for the nominal blade in the hot state no longer exists;

wherein the provisioning of an initially mistuned blade having a reduced or increased thickness compared to the nominal blade in at least one of the profile elements comprises that the difference between a distortion energy and a kinetic energy of an excited nominal blade is determined and the thickness of the nominal blade is increased or reduced as a function of the determined difference between the distortion energy and the kinetic energy in a region under consideration.

* * * * *